(12) United States Patent
Biadsy et al.

(10) Patent No.: US 12,205,578 B2
(45) Date of Patent: Jan. 21, 2025

(54) PREVENTING NON-TRANSIENT STORAGE OF ASSISTANT INTERACTION DATA AND/OR WIPING OF STORED ASSISTANT INTERACTION DATA

(71) Applicant: GOOGLE LLC, Mountain View, CA (US)

(72) Inventors: Fadi Biadsy, Sandyston, NJ (US); Johan Schalkwyk, Scarsdale, NY (US); Jason Pelecanos, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 247 days.

(21) Appl. No.: 17/788,183

(22) PCT Filed: Jan. 7, 2021

(86) PCT No.: PCT/US2021/012404
§ 371 (c)(1),
(2) Date: Jun. 22, 2022

(87) PCT Pub. No.: WO2021/142055
PCT Pub. Date: Jul. 15, 2021

(65) Prior Publication Data
US 2023/0037085 A1    Feb. 2, 2023

Related U.S. Application Data

(60) Provisional application No. 62/958,276, filed on Jan. 7, 2020.

(51) Int. Cl.
*G10L 15/22* (2006.01)
*G10L 15/18* (2013.01)

(52) U.S. Cl.
CPC .......... *G10L 15/1815* (2013.01); *G10L 15/22* (2013.01); *G10L 2015/223* (2013.01)

(58) Field of Classification Search
CPC ................ G10L 15/1815; G10L 15/22; G10L 2015/223; G06F 3/167
See application file for complete search history.

(56) References Cited

U.S. PATENT DOCUMENTS

| | | | |
|---|---|---|---|
| 9,680,983 B1 * | 6/2017 | Schuster | ................. G10L 25/24 |
| 10,200,824 B2 | 2/2019 | Gross et al. | |
| 10,332,517 B1 * | 6/2019 | Wang | ................. G06F 21/6245 |
| 11,809,774 B1 * | 11/2023 | Vitt | ......................... G06F 3/165 |
| 2014/0372126 A1 * | 12/2014 | Ady | ......................... G10L 25/48 |
| | | | 704/270.1 |

(Continued)

FOREIGN PATENT DOCUMENTS

| | | |
|---|---|---|
| CN | 110291489 | 9/2019 |
| WO | 2018152016 | 8/2018 |

(Continued)

OTHER PUBLICATIONS

Intellectual Property India, First Examination Report issued in Application No. IN202227009680, 6 pages, dated Aug. 18, 2022.

(Continued)

*Primary Examiner* — Douglas Godbold
(74) *Attorney, Agent, or Firm* — Gray Ice Higdon

(57) ABSTRACT

Implementations disclosed herein are directed to techniques for selectively enabling and/or disabling non-transient storage of one or more instances of assistant interaction data for turn(s) of a dialog between a user and an automated assistant. Implementations are additionally or alternatively directed to techniques for retroactive wiping of non-transiently stored assistant interaction data from previous assistant interaction(s).

17 Claims, 8 Drawing Sheets

(56) References Cited

U.S. PATENT DOCUMENTS

| | | | | |
|---|---|---|---|---|
| 2018/0096072 | A1* | 4/2018 | He | G06F 16/337 |
| 2018/0096675 | A1 | 4/2018 | Nygaard | |
| 2018/0137263 | A1* | 5/2018 | Kurian | B60N 2/002 |
| 2018/0157333 | A1* | 6/2018 | Ross | G06F 3/013 |
| 2018/0232201 | A1* | 8/2018 | Holtmann | G06V 40/103 |
| 2018/0241703 | A1* | 8/2018 | Feuz | G06Q 10/107 |
| 2019/0073998 | A1* | 3/2019 | Leblang | G06F 16/3344 |
| 2019/0173446 | A1* | 6/2019 | Knode | H03G 3/32 |
| 2019/0347068 | A1* | 11/2019 | Khaitan | G06F 3/167 |
| 2019/0371328 | A1* | 12/2019 | Wang | G06F 21/64 |
| 2020/0034492 | A1* | 1/2020 | Verbeke | G06F 16/636 |
| 2020/0196141 | A1* | 6/2020 | Baker | H04W 12/02 |
| 2020/0244788 | A1* | 7/2020 | Adams | H04M 1/271 |
| 2020/0394086 | A1* | 12/2020 | Lee | G06F 3/017 |
| 2021/0211823 | A1* | 7/2021 | Shani | G06F 3/165 |
| 2021/0240020 | A1* | 8/2021 | Chang | G02F 1/133603 |
| 2021/0304744 | A1* | 9/2021 | Pawar | F21V 33/0056 |
| 2021/0329165 | A1* | 10/2021 | Liu | G06F 21/6245 |

FOREIGN PATENT DOCUMENTS

| | | |
|---|---|---|
| WO | 2019051214 | 3/2019 |
| WO | 2021142055 | 7/2021 |

OTHER PUBLICATIONS

Intellectual Property India; Examination Report issued in Application No. 202228067963; 6 pages; dated 10 Jul. 1, 2023.

European Patent Office; Communication pursuant to Article 94(3) EPC issued in Application No. 21703097.2; 5 pages; dated Oct. 11, 2023.

China National Intellectual Property Administration; Notification of First Office Action issued in 1 Application No. 202180005458.4; 30 pages; dated Oct. 12, 2023.

European Patent Office; Invitation to Pay Additional Fees; Ser No. PCT/US2021/012404; 13 pages; dated Mar. 31, 2021.

European Patent Office; international Search Report and Written Opinion issued for Application No. PCT/US2021/012404, 19 pages, dated May 21, 2021.

Intellectual Property India; Hearing Notice issued in Application No. 202227009680; 2 pages, dated Feb. 2, 2024.

China National Intellectual Property Administration; Notification of Second Office Action issued in Application No. 202180005458.4; 13 pages; dated Apr. 26, 2024.

China National Intellectual Property Administration; Notice of Grant issued in Application No. 202180005458.4; 4 pages; dated Sep. 11, 2024.

* cited by examiner

PREVENTING NON-TRANSIENT STORAGE OF ASSISTANT INTERACTION DATA AND/OR WIPING OF STORED ASSISTANT INTERACTION DATA

BACKGROUND

Humans can engage in human-to-computer interactions with interactive software applications referred to herein as "automated assistants". For example, a human (which when interacting with an automated assistant may be referred to as a "user") may provide an input to the automated assistant that can cause the automated assistant to generate and provide responsive output, to control one or more smart devices, and/or to perform one or more other functionalities. The input provided by the user can be, for example, a touch input (e.g., via a touchscreen), a gesture (e.g., detected via a camera), and/or a spoken natural language input (i.e., utterance detected via microphone(s)), which may in some cases be converted into text (or other semantic representation) and then further processed.

In many cases, automated assistants include automated assistant clients that are executed locally by assistant client devices (a client device that includes an assistant client application, also referenced as an assistant device) and that are engaged with directly by users, as well as cloud counterpart(s) that leverage the more robust resources of the cloud to help automated assistant clients respond to users' inputs. For example, an automated assistant client can provide, to the cloud counterpart(s), an audio recording of a spoken utterance of a user (and/or a text conversion thereof), and optionally data indicative of an account associated with the user. The cloud counterpart may perform various processing on the spoken utterance (and/or the text conversion thereof) to return responsive result(s) to the automated assistant client, which may then provide corresponding output to the user.

With permission from a user, assistant interaction data from interactions between the user and the automated assistant can be non-transiently stored in computer-readable media of the cloud counterpart(s) and/or of the assistant devices. For example, an instance of interaction data can be stored responsive to a dialog turn between the user and the automated assistant such as a dialog turn that includes user spoken input of "what's the weather in Louisville" and an assistant response of "85 and sunny". The instance of interaction data can include, for example, audio data that captures the user spoken input, the generated text transcription thereof (e.g., generated using a speech-to-text model), natural language understanding (NLU) data based on the text transcription (e.g., an intent (e.g., "today's weather") and/or parameter(s) (e.g., the city of Louisville), and/or data that characterizes the assistant response (e.g., the response itself and/or topic(s) of the response). An instance of interaction data can be non-transiently stored in that it is stored for a duration that extends beyond the duration needed to generate and provide responsive output, to control one or more smart devices, and/or to perform one or more other functionalities.

With permission from the user, the non-transiently stored assistant interaction data can be used for various purposes, such as improving future interactions between the user and the assistant. For example, the assistant interaction data can be used to infer topic(s) of interest to a user (e.g., based on topic(s) included in assistant response data and/or NLU data), and updates related to those topic(s) proactively provided to the user via the automated assistant. Such proactive updates can result in more efficient (e.g., shorter duration) automated assistant interactions as the need for the user to provide input requesting the updates is obviated. As another example, the assistant interaction data can be used in training machine learning model(s) used by the automated assistant to be more accurate and/or robust, such as speech recognition models and/or NLU models. Accordingly, various technical benefits can be achieved through non-transient storage and use of assistant interaction data. However, for some interactions non-transient storage of assistant interaction data can be undesirable in view of various considerations.

SUMMARY

Implementations disclosed herein are directed to techniques for selectively enabling and/or disabling non-transient storage of one or more instances of assistant interaction data for turn(s) of a dialog between a user and an automated assistant.

Some of those implementations proactively prevent storage of assistant interaction data, for turn(s) of a dialog, responsive to certain user input(s) received at an assistant device. In some versions of those implementations, whether storage of assistant interaction data is proactively prevented, or is instead enabled, can be dependent on how the assistant is invoked by the user at the initiation of the turns of the dialog. Put another way, in some of those versions storage of assistant interaction data can be prevented when the assistant is invoked in one or more first manners and can be enabled when the assistant is instead invoked in one or more second manners. As one example, some of those versions can proactively prevent such storage for dialog turn(s) that follow certain assistant invocation phrase(s) (e.g., "secret assistant") while enabling such storage for dialog turn(s) that follow certain other assistant invocation phrase(s) (e.g., "OK Assistant"). As another example, some of those versions can additionally or alternatively proactively prevent such storage for dialog turn(s) that follow certain assistant invocation interaction(s) with a software or hardware invocation button (e.g., a long press), while enabling such storage for dialog turn(s) that follow certain other assistant invocation interaction(s) with a software or hardware invocation button (e.g., a short press). As another example, some of those versions can additionally or alternatively proactively prevent such storage for dialog turn(s) that follow certain invocation-free and touch-free assistant invocation interaction(s) (e.g., gesture-based invocation interaction(s) detected via camera(s) of the assistant device), while enabling such storage for dialog turn(s) that follow certain other invocation-free and touch-free assistant invocation interaction(s). For instance, the assistant can be invoked based on locally processing image(s) from the camera and determining certain gesture(s) are being made by a user and, optionally, that other condition(s) are present in the image(s) (e.g., a gaze of the gesturing user is directed to the camera and/or a body and/or head pose of the gesturing user is facing the camera). In such an instance, such storage can be proactively prevented if the gesture is detected as a user holding their finger in front of their mouth in a shushing gesture, while enabled if the gesture is detected as a user waving. It is noted that in some of the aforementioned versions, such storage can always be proactively prevented for all dialog turn(s) except for those that follow certain non-default (i.e., standard "out-of-the-box") invocation phrase(s), follow a non-default invocation interaction(s), and/or follow particular phrase(s). For instance, the default can be to proactively prevent such storage unless the user utilizes a non-default invocation phrase such as "OK non-private assistant".

In some additional or alternative versions of those implementations, such storage can be proactively prevented for dialog turn(s) that follow certain spoken phrase(s) (e.g., "don't store this", "don't store anything for the next 5 minutes") provided after invocation, while enabling such storage for dialog turn(s) that don't follow certain spoken phrases provided after invocation.

Regardless of the technique for activating the proactive prevention of such storage, the prevention of such storage can persist until one or more termination conditions are satisfied, such as passage of a threshold amount of time (e.g., a fixed time or a time specified in the user input), conclusion of a dialog session, and/or conclusion of a dialog turn. Moreover, in various implementations audible and/or visual cue(s) are provided during the prevention of such storage to enable guiding of the user/assistant dialog so that the user can be aware of the persisting of the prevention of such storage, while preventing interference of the user/assistant dialog. For example, visual cue(s) can be provided via a display of an assistant device and/or via light emitting diode(s) of the assistant device throughout the duration of the proactive prevention of such storage, and can cease when the prevention is terminated (e.g., responsive to the occurrence of the termination condition(s)). In these and other manners, the audible and/or visual cue(s) can guide the user/assistant interaction to ensure the user is aware of when storage is being prevented and when it is enabled. This can inform the user when storage is being prevented, thereby mitigating occurrences of the user providing input(s) for preventing storage in situations where storage is already being prevented. Accordingly, occurrences of unnecessarily prolonging the dialog can be prevented, along with prevention of unnecessary utilization of resources in processing such input(s).

In various implementations, storage of assistant interaction data for interaction with any of multiple assistant devices, of a coordinated ecosystem of assistant devices associated with a user, can be prevented responsive to a corresponding user input detected at only a subset (e.g., just one) of the multiple assistant devices. In these and other manners, user input(s) for preventing storage for dialog turn(s) and detected at a first assistant device, can nonetheless prevent storage at a second assistant device. This can ensure that the storage is prevented at the second assistant device if the second assistant device processes utterance(s) received during the dialog turn(s) (e.g., due to an error in device arbitration and/or or due to the user moving locations to be closer to the second assistant device). In some of those various implementations, each of the multiple assistant device(s) can render corresponding audible and/or visual cue(s) during the prevention of such storage. In these and other manners, the audible and/or visual cue(s) can guide the user/assistant interaction to ensure the user is aware, on a device-by-device basis, of when storage is being prevented and when it is enabled. This can mitigate occurrences of the user providing input(s) for preventing storage in situations where storage is already being prevented.

Some implementations disclosed herein additionally or alternatively retroactively wipe stored instance(s) of assistant interaction data responsive to certain user input(s) received at an assistant device. As one example, some of those implementations can retroactively clear any assistant interaction data timestamped within the last week responsive to spoken input, directed to the automated assistant, of "delete everything from the past week". For example, those instances of assistant interaction data timestamped within a week of a current time, and associated with an account of the user that provided the spoken input, can be wiped. The account of the user that provided the spoken input can be determined using speaker identification technique(s), face matching technique(s), and/or other identification techniques. Likewise, the instances of assistant interaction data can be stored in association with the account based on using similar technique(s) to identify the account when the corresponding assistant interaction(s) occurred.

In some implementations, when spoken input causes retroactive wiping of assistant interaction data from previous assistant interaction(s), any future action(s) queued for future performance based on the previous assistant interaction(s), but not yet performed, can be maintained. In other words, those future action(s) will still be performed in the future. For example, a previous assistant interaction in which spoken input of "turn on the living loom lights at 10:00" can queue the future action of causing the living room lights to transition to an on state at 10:00. Even if the associated assistant interaction data is wiped, the future action can persist and, as a result, the living room lights will still be transitioned to the on state at 10:00.

In some implementations, spoken input indicates a desire to wipe assistant interaction data, but fails to specify a temporal period for wiping such data. For example, the spoken input can be "delete what I just said" instead of "delete everything from the past X temporal period" (e.g., hour(s), minute(s), day(s)). In some of those implementations, the assistant interaction data to wipe can be determined based on identifying those instances of assistant interaction data from a most recent dialog session, and wiping the identified instances. Instance(s) of assistant interaction data can be determined to belong to the same dialog session based on one or more considerations, such as comparison(s) between attribute(s) of the instances. For example, assume a first instance for a first turn of human/assistant dialog and a second instance for a second turn of human/assistant dialog. Whether the two instances are determined to belong to the same dialog session can be based on comparison of timestamps for the two instances and/or comparison of topic(s) of the two instances. For instance, the timestamp of the first instance can indicate a time of the human input and/or the assistant response (and/or action) of the first turn and the timestamp of the second instance can likewise indicate a time of the human input and/or the assistant response (and/or action of the second turn). Closer temporal proximity of the two timestamps can be more indicative of the two instances belonging to the same session. For instance, they can be considered to belong to the same session if the temporal proximity satisfies a threshold. Whether the topic(s) of the two instance(s) are the same and/or similar can additionally or alternatively be considered.

In some implementations, a dialog session can include a logically-self-contained exchange of one or more messages between a user and an automated assistant. Differentiation between multiple dialog sessions can be based on various signals, such as passage of time between sessions, change of user context (e.g., location, before/during/after a scheduled meeting, etc.) between sessions, detection of one or more intervening interactions between the user and an assistant device other than dialog between the user and the automated assistant (e.g., the user switches applications for a while, the user walks away from then later returns to a standalone voice-activated product), locking/sleeping of the assistant device between sessions, change of assistant devices used to interface with one or more instances of automated assistant, and so forth.

The preceding is provided as an overview of only some implementations disclosed herein. Those and/or other implementations are described in more detail below.

DETAILED DESCRIPTION

Figure 1:
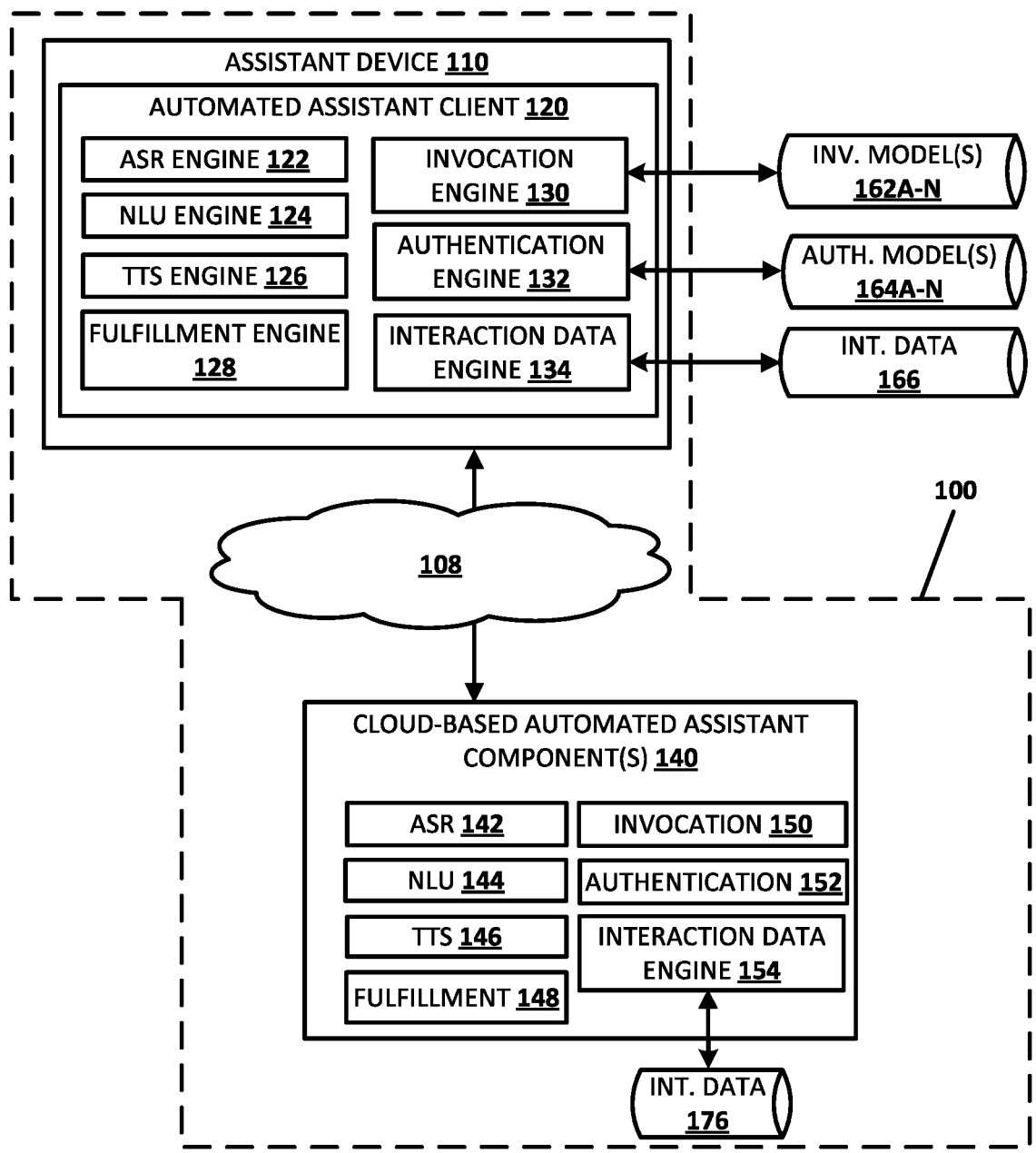
FIG. 1 illustrates an example environment in which implementations disclosed herein can be implemented.

Turning initially to FIG. 1, an assistant device 110 can include one or microphones, one or more speakers, and, optionally, one or more camera(s) and/or other vision components and/or display(s) (e.g., a touch-sensitive display). The assistant device 110 at least selectively executes an automated assistant client 120. The automated assistant client 120 can include, for example, an on-device automatic speech recognition (ASR) engine 122, an on-device natural language understanding (NLU) engine 124, an on-device text-to-speech (US) engine 126, an on-device fulfillment engine 128, an on-device invocation engine 130, and on-device authentication engine 1332, and/or an on-device interaction data engine 134. The automated assistant client 120 can include additional and/or alternative engines, such as a voice activity detector (VAD), an endpoint detector, and/or other engine(s).

One or more cloud-based automated assistant components 140 can optionally be implemented on one or more computing systems (collectively referred to as a "cloud" computing system) that are communicatively coupled to an assistant device via one or more local and/or wide area networks (e.g., the Internet) 108. The cloud-based automated assistant components 140 can be implemented, for example, via a cluster of high-performance servers. The cloud-based automated assistant components 140 are described in more detail below.

In various implementations, an instance of an automated assistant client 120, optionally by way of its interactions with cloud-based automated assistant components 140, may form what appears to be, from a user's perspective, a logical instance of an automated assistant 100 with which the user may engage in a human-to-computer interactions (e.g., spoken interactions, gesture-based interactions, and/or touch-based interactions).

The assistant device 110 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (optionally with a display and/or a camera), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative assistant devices may be provided.

The optional vision component(s) of the assistant device 110 can take various forms, such as monographic cameras, stereographic cameras, a LIDAR component (or other laser-based component(s)), a radar component, etc. The one or more vision components may be used to capture vision frames (e.g., image frames, laser-based vision frames) of an environment in which the assistant device is deployed. The vision frame(s) can be used, e.g., by on-device invocation engine 130, on-device authentication engine 132, and/or other engine(s) of automated assistant 100 (e.g., cloud-based invocation engine 150 and/or cloud-based authentication engine 152).

In some implementations, such vision frame(s) can be utilized, by the on-device invocation engine 130, to determine whether a user (any user or any of one or more registered users) is present near the assistant device, to determine whether a user is providing touch-free invocation gesture(s), and/or to determine a distance of the user (e.g., the user's face) relative to the assistant device. Such determination(s) can be utilized, for example, by the on-device invocation engine 130 in determining whether to activate on-device ASR engine 122 and/or other assistant component(s). For example, the on-device invocation engine 130 can process vision frame(s), using one or more of the invocation model(s) 162A-N (e.g., neural network model(s)), in determining whether a user, captured in the vision frame(s), is providing a touch-free invocation gesture. For instance, the invocation engine 130 can process the vision frame(s) in determining whether the user is providing a touch-free invocation gesture and which touch-free invocation gesture is being provided. As described herein, one or more touch-free invocation gestures can be performed to cause proactive prevention of storing of assistant interaction data and one or more other touch-free invocation gestures can be performed to cause enabling of storing of assistant interaction data. The on-device invocation engine 130 can provide, to on-device interaction data engine 134, an indication of which touch-free invocation gesture is being provided and the on-device interaction data engine 134 can utilize the indication in determining whether to proactively prevent storing of assistant interaction data for dialog turn(s) that follow the touch-free invocation or, instead, to enable storing of such assistant interaction data. For example, the on-device interaction data engine 134 can utilize the indication to determine whether to store such assistant interaction data locally in on-device interaction data database 166, which is on one or more computer readable media local to the assistant device 110. As another example, the on-device interaction data engine 134 can transmit the indication (or related data) to cloud-based automated assistant component(s) 140 to enable or prevent cloud-based storage, by cloud-based interaction data engine 154, of such assistant interaction data.

In some implementations, such vision frame(s) can additionally or alternatively be utilized, by the on-device authentication engine 132, to determine an account associated with a user that is in the vision frame(s) and that is interacting with the assistant device 110 (e.g., determined based on the vision frame(s) indicating the user's gaze, body pose, and/or head pose is directed to the assistant device 110). For example, the on-device authentication engine 132 can process vision frame(s), using one or more of the on-device authentication model(s) 164A-N (e.g., neural network model(s)) locally stored at assistant device 110, in determining whether feature(s) of a user, captured in the vision frame(s), sufficiently match stored feature(s) for an account registered with the assistant device 110. For instance, the vision frame(s) (e.g., at least the part capturing a face of the user) can be processed, using one or more of the on-device authentication model(s) 164A-N, to generate a face embedding for a face of a user, and that face embedding compared to a stored face embedding previously generated during an enrollment procedure for an account of the user. If the comparison indicates a sufficient match (e.g., less than a threshold distance in embedding space), the authentication engine 132 can determine an upcoming or ongoing interaction is from a user associated with the account.

As described herein, the user can provide a spoken utterance that expresses an intent to wipe assistant interaction data for prior assistant interactions of the user. In some of those implementations, the on-device authentication engine 132 can provide, to on-device interaction data engine 134, an indication of the account of the user and the on-device interaction data engine 134 can utilize the indication in ensuring interaction data that is stored in association with the account is wiped. For example, the on-device interaction data engine 134 can utilize the indication to identify assistant interaction data that is stored locally, in association with the account, in on-device interaction data database 166. As another example, the on-device interaction data engine 134 can transmit the indication (or related data) to cloud-based automated assistant component(s) 140 to enable cloud-based interaction data engine 154, to identify and wipe assistant interaction data that is stored in association with the account in remote interaction database 176.

The on-device invocation engine 130 can, in addition to or instead of invoking the automated assistant 100 based on vision frame(s), invoke the automated assistant 100 based on detecting the occurrence of an assistant invocation phrase and/or the occurrence of one or more hardware and/or software button actuations. For example, the on-device invocation engine 130 can invoke the automated assistant 100 in response to detecting a spoken assistant invocation phrase such as "Hey Assistant," "OK Assistant", "Assistant", "Secret Assistant", and/or "Private Assistant". The on-device invocation engine 130 can continuously process (e.g., if not in an "inactive" mode), using one or more of the on-device invocation model(s) 162A-N, a stream of audio data frames that are based on output from one or more microphones of the assistant device 110, to monitor for an occurrence of an assistant invocation phrase. For example, one or more first on-device invocation model(s) 162A-N can be utilized in processing audio data frames in monitoring for one or more first invocation phrases (e.g., those that cause proactive prevention of storing of assistant interaction data). One or more second on-device invocation model(s) 162A-N can be utilized, in parallel, in processing audio data frames in monitoring for one or more second invocation phrases (e.g., those that cause storing of assistant interaction data). While monitoring for the occurrence of the spoken assistant invocation phrase, the on-device invocation engine 130 discards (e.g., after temporary storage in a buffer) any audio data frames that do not include the spoken invocation phrase. However, when the on-device invocation engine 130 detects an occurrence of a spoken invocation phrase in processed audio data frames, the on-device invocation engine 130 can invoke the automated assistant 100. As used herein, "invoking" the automated assistant can include causing one or more previously inactive functions of the automated assistant to be activated. For example, invoking the automated assistant can include causing one or more local engines and/or cloud-based automated assistant components to further process audio data frames based on which the invocation phrase was detected, and/or one or more following audio data frames (whereas prior to invoking no further processing of audio data frames was occurring). For instance, local and/or cloud-based components can process captured audio data using an ASR model in response to invocation of the automated assistant.

As described herein, detection of certain invocation phrase(s) can cause proactive prevention of storing of assistant interaction data and detection of certain other invocation phrase(s) can cause enabling of storing of assistant interaction data. The on-device invocation engine 130 can provide, to on-device interaction data engine 134, an indication of which invocation phrase is provided and the on-device interaction data engine 134 can utilize the indication in determining whether to proactively prevent storing of assistant interaction data for dialog turn(s) that follow the touch-free invocation or, instead, to enable storing of such assistant interaction data. For example, the on-device interaction data engine 134 can utilize the indication to determine whether to store such assistant interaction data locally in on-device interaction data database 166, which is on one or more computer readable media local to the assistant device 110. As another example, the on-device interaction data engine 134 can transmit the indication (or related data) to cloud-based automated assistant component(s) 140 to enable or prevent cloud-based storage, by cloud-based interaction data engine 154, of such assistant interaction data. In implementations where proactive prevention of storing of assistant interaction data is based on the manner in which the assistant is invoked, the interaction data engine 134 can utilize the indication of that manner to prevent storage of any assistant interaction data before spoken input and/or other data on which the assistant interaction data is generated is even provided. In these and other manners, the interaction data engine 134 can ensure assistant interaction data is only transiently stored (if at all) for only an amount of time necessary for resolving a corresponding user request. This can minimize (or even eliminate) the amount of time that memory and/or other resources are utilized in transiently storing assistant interaction data.

The on-device authentication engine 132 can, in addition to or instead of determining an account of an interacting user based on vision frame(s), process audio frame(s) to determine the account. For example, the on-device authentication engine 132 can process audio frame(s), using one or more of the on-device authentication model(s) 164A-N (e.g., neural network model(s)) locally stored at assistant device 110, in determining whether feature(s) of voice input, captured in the audio frame(s), sufficiently match stored feature(s) for an account registered with the assistant device 110. For instance, the audio frame(s) can be processed, using one or more of the on-device authentication model(s) 164A-N, to generate a speaker embedding, and that speaker embedding compared to a stored speaker embedding previously generated during an enrollment procedure for an account of the user. If the comparison indicates a sufficient match (e.g., less than a threshold distance in embedding space), the authentication engine 132 can determine an upcoming or ongoing interaction is from a user associated with the account. The audio frame(s) can include those that capture the invocation phrase (e.g., text-dependent speaker identification) and/or those that follow an invocation (e.g., text-independent speaker identification).

As described herein, the user can provide a spoken utterance that expresses an intent to wipe assistant interaction data for prior assistant interactions of the user. In some of those implementations, the on-device authentication engine 132 can provide, to on-device interaction data engine 134, an indication of the account of the user and the on-device interaction data engine 134 can utilize the indication in ensuring interaction data that is stored in association with the account is wiped.

On-device ASR engine 122 can process audio data that captures a spoken utterance, utilizing on-device speech recognition model, to generate recognized text that corresponds to the spoken utterance. The optional on-device NLU engine 124 of the assistant device performs on-device natural language understanding on the recognized text to generate NLU data. On-device NLU engine 124 can optionally utilize one or more on-device NLU models in generating the NLU data. NLU data can include, for example, intent(s) that correspond to the spoken utterance and optionally parameter(s) (e.g., slot values) for the intent(s). For example, the NLU data can indicate whether an utterance expresses an intent to retroactively wipe assistant interaction data and/or to proactively prevent storage of assistant interaction data. When the NLU data indicates such an intent, the NLU engine 124 can provide an indication of the intent to interaction data engine 134 for handling appropriately. The NLU data can further include parameter(s) for such an intent, such as a duration for proactively preventing storage and/or a temporal period for which assistant interaction data is to be wiped. Such parameter(s) can also be provided to the interaction data engine 134 for handling. As described herein, when such parameter(s) are absent, the interaction data engine 134 can utilize various techniques in automatically determining a duration or temporal period, and can optionally cause an audible and/or visual indication of that automatic determination to be provided.

Further, optional on-device fulfillment engine 128 of the assistant device generates fulfillment data using the NLU data. On-device fulfillment engine 128 can optionally utilize one or more on-device fulfillment models in generating the fulfillment data. This fulfillment data can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data is then provided for local and/or remote performance/execution of the determined action(s) to resolve the spoken utterance. Execution can include, for example, rendering local and/or remote responses (e.g., visually and/or audibly rendering (optionally utilizing on-device TTS engine 126)), interacting with locally installed applications, transmitting command(s) to IoT device(s), and/or other action(s). Optional on-device TTS engine 126 can generate synthesized speech using one or more on-device TTS models. On-device TTS engine 126 can be utilized by fulfillment engine 128 in generating synthesized speech for certain audible local responses. TTS engine 126 can also be utilized to generate audible cue(s) described herein.

Optional display(s) of assistant device 110 can be utilized to render various visual cues described herein and/or can be one of the user interface output component(s) through which visual portion(s) of a response, from automated assistant client 120, is rendered. Visual cue(s) can additionally or alternatively be rendered via light emitting diodes and/or other visual output device(s). Further, audible cue(s) can be rendered via speaker(s) of assistant device 110.

In some implementations, cloud-based automated assistant component(s) 140 can include a remote ASR engine 142 that performs speech recognition, a remote NLU engine 144 that performs natural language understanding, a remote TTS engine 146 that generates synthesized speech, a remote fulfillment engine 148 that generates fulfillment data, an remote invocation engine 150 that determines whether and/or how the assistant 100 was invoked (or verifies the on-device invocation engine 130 determination), an authentication engine 152 that determines an account (if any) for an interacting user (or verifies the on-device authentication engine 132 determination), and an interaction data engine 154. The interaction data engine 154 can selectively store interaction data in remote interaction data database 176. Further, the interaction data engine 154 can retroactively wipe assistant interaction data, from remote interaction data database 176 and for an account, based on a received indication from interaction data engine 134 and/or a self-determination utilizing other techniques described herein. Further, the interaction data engine 154 can additionally or alternatively proactively prevent (or enable) storing of assistant interaction data, at remote interaction database 176 and for dialog turn(s), based on a on a received indication from interaction data engine 134 and/or a self-determination utilizing other techniques described herein. A remote execution module can also optionally be included that performs remote execution based on local or remotely determined fulfillment data.

Additional and/or alternative remote engines can be included. In various implementations on-device speech processing, on-device NLU, on-device fulfillment, and/or on-device execution can, when provided on an assistant device, be prioritized at least due to the latency and/or network usage reductions they provide when resolving a spoken utterance (due to no client-server roundtrip(s) being needed to resolve the spoken utterance). However, one or more cloud-based automated assistant component(s) can be utilized at least selectively. For example, such component(s) can be utilized in parallel with on-device component(s) and output from such component(s) utilized when local component(s) fail. For example, on-device fulfillment engine can fail in certain situations (e.g., due to relatively limited resources of client 160) and remote fulfillment engine can utilize the more robust resources of the cloud to generate fulfillment data in such situations. Remote fulfillment engine can be operated in parallel with on-device fulfillment engine and its results utilized when on-device fulfillment fails, or can be invoked responsive to determining failure of on-device fulfillment.

In various implementations, an NLU engine (on-device and/or remote) can generate annotated output that includes one or more annotations of the recognized text and one or more (e.g., all) of the terms of the natural language input. In some implementations an NLU engine is configured to identify and annotate various types of grammatical information in natural language input. For example, an NLU engine may include a morphological module that may separate individual words into morphemes and/or annotate the morphemes, e.g., with their classes. An NLU engine may also include a part of speech tagger configured to annotate terms with their grammatical roles. Also, for example, in some implementations an NLU engine may additionally and/or alternatively include a dependency parser configured to determine syntactic relationships between terms in natural language input.

In some implementations, an NLU engine may additionally and/or alternatively include an entity tagger configured to annotate entity references in one or more segments such as references to people (including, for instance, literary characters, celebrities, public figures, etc.), organizations, locations (real and imaginary), and so forth. In some implementations, an NLU engine may additionally and/or alternatively include a coreference resolver (not depicted) configured to group, or "cluster," references to the same entity based on one or more contextual cues. In some implementations, one or more components of an NLU engine may rely on annotations from one or more other components of the NLU engine.

An NLU engine may also include an intent matcher that is configured to determine an intent of a user engaged in an interaction with automated assistant 100. An intent matcher can use various techniques to determine an intent of the user. In some implementations, an intent matcher may have access to one or more local and/or remote data structures that include, for instance, a plurality of mappings between grammars and responsive intents. For example, the grammars included in the mappings can be selected and/or learned over time, and may represent common intents of users. For example, one grammar, "play <artist>", may be mapped to an intent that invokes a responsive action that causes music by the <artist> to be played on the assistant device. Another grammar, "[weather I forecast] today," may be match-able to user queries such as "what's the weather today" and "what's the forecast for today?" In addition to or instead of grammars, in some implementations, an intent matcher can employ one or more trained machine learning models, alone or in combination with one or more grammars. These trained machine learning models can be trained to identify intents, e.g., by embedding recognized text from a spoken utterance into a reduced dimensionality space, and then determining which other embeddings (and therefore, intents) are most proximate, e.g., using techniques such as Euclidean distance, cosine similarity, etc. As seen in the "play <artist>" example grammar above, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Other slot value(s) can be inferred based on, for example, user location, currently rendered content, user preferences, and/or other cue(s).

A fulfillment engine (local and/or remote) can be configured to receive the predicted/estimated intent that is output by an NLU engine, as well as any associated slot values and fulfill (or "resolve") the intent. In various implementations, fulfillment (or "resolution") of the user's intent may cause various fulfillment information (also referred to as fulfillment data) to be generated/obtained, e.g., by fulfillment engine. This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

As described herein, in various implementations the assistant interaction data can include data generated by one or more of the assistant device 110 and/or cloud component(s) 140 described above, such as the ASR engines, the NLU engines, and/or fulfillment modules (or data that is based on such generated data). The assistant interaction data, when non-transiently stored, can be stored at the cloud component(s) 140 (e.g., in database 176) and/or the assistant device 110. Accordingly, when wiped (or prevented from being stored), the wiping (or prevention of storage) can be at the cloud component(s) 140 and/or the assistant device 110.

Referring to FIGS. 2A, 2B, 2C, 2D, and 2E example interactions between a user 201 and an assistant device 205 are illustrated, and demonstrate aspects of various implementations disclosed herein.

Figure 2A:
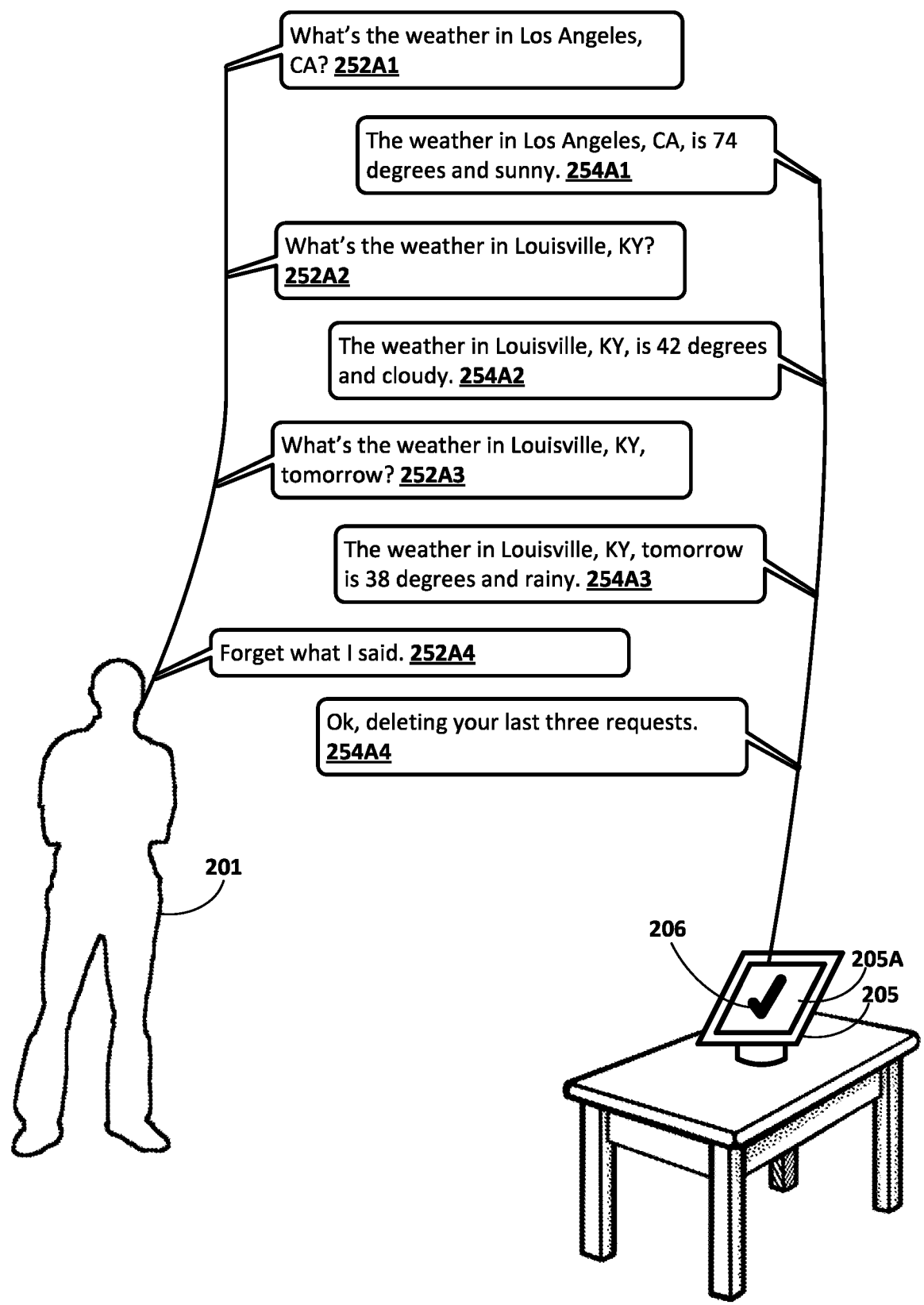
FIGS. 2A, 2B, 2C, and 2D each illustrate an example interaction between a user and an assistant device, according to various implementations disclosed herein.

In FIG. 2A, the user 201 provides three spoken utterances 252A1, 252A2, and 252A3, and corresponding assistant responses 254A1, 254A2, and 254A3 are rendered audibly (and optionally visually) by the assistant device 205. Each spoken utterance and assistant response pair (e.g., 252A1 and 254A1 is one pair) can be a turn of a dialog and, in the example of FIG. 2A relatively little time can pass between the turns (e.g., less than 5 seconds between completion of the response 254A1 and the utterance 252A2, and the same for response 254A2 and the utterance 252A3). Spoken utterance 252A4 indicates an intent to wipe assistant interaction data for one or more prior assistant interactions, but fails to indicate any temporal period (e.g., date range, hour range, minute range) for wiping the assistant interaction data. As a result, the automated assistant can, in some implementations, wipe assistant interaction data for only those interactions of a most recent dialog session, optionally if that most recent dialog session concluded within a threshold time of receiving the spoken utterance 252A4. In the example of FIG. 2A, assistant interaction data for any of all three spoken utterances 252A1, 252A2, and 252A3, and any of all three corresponding assistant responses 254A1, 254A2, and 254A3 can be wiped based on determining all three spoken utterances and all three assistant responses form part of a single dialog session. Such a determination can be made (e.g., by on-device interaction data engine 134 or remote interaction data engine 154) based on all three turns occurring in close temporal proximity to one another (e.g., each turn past the initial turn starting within X seconds of a preceding turn's conclusion) and/or based on similarity of topic(s) of the turn(s) (e.g., based on all turns having a weather intent, as determined based on NLU data). In FIG. 2A, a visual cue 206 (a "checkmark") is provided on the display 205A of the assistant device to visually indicate that the request of the spoken utterance 252A4 was performed. Further, an assistant response 254A4 is also audibly provided, and indicates that assistant interaction data for all three turns will be deleted responsive to the request of the spoken utterance 252A4, removing any ambiguity of the action taken responsive to the vague spoken utterance 252A4.

Figure 2B:
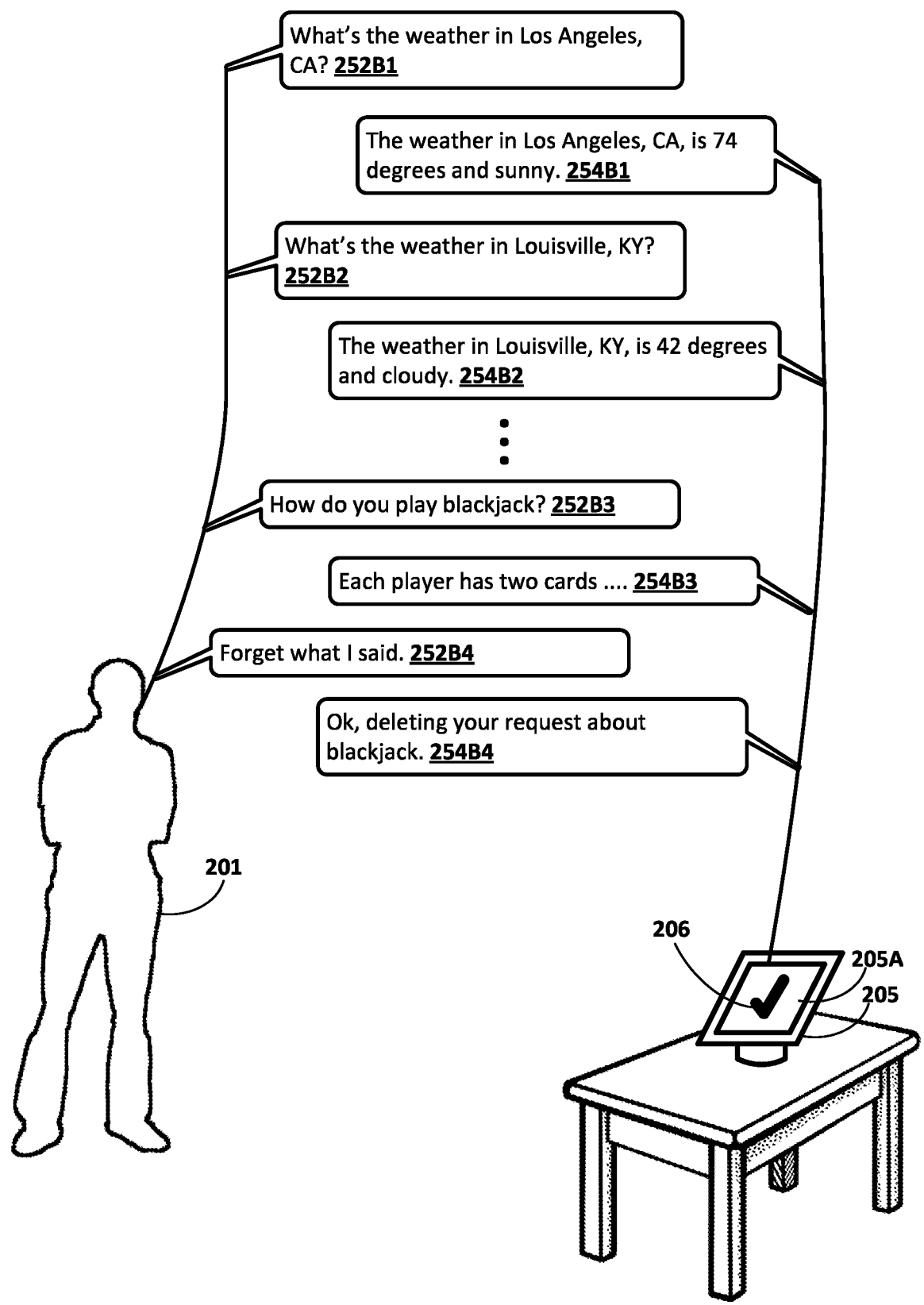

In FIG. 2B, the user provides three spoken utterances 252B1, 252B2, and 252B3, and corresponding assistant responses 254B1, 254B2, and 254B3 are rendered audibly (and optionally visually) by the assistant device 205. Each spoken utterance and assistant response pair (e.g., 252A1 and 254A1) can be a turn of a dialog and, in the example of FIG. 2A relatively little time can pass between the first two turns (first turn of 252B1 and 254B1, and second turn of 252B2 and 254B2), but a relatively large time gap (e.g., 30 seconds or more) can occur between the second and third turns. Spoken utterance 252B4 indicates an intent to wipe assistant interaction data for one or more prior assistant interactions, but fails to indicate any temporal period (e.g., date range, hour range, minute range) for wiping the assistant interaction data. As a result, the automated assistant can, in some implementations, wipe assistant interaction data for only those interactions of a most recent dialog session, optionally if that most recent dialog session concluded within a threshold time of receiving the spoken utterance 252B4. In the example of FIG. 2B, assistant interaction data for only the most recent turn (i.e., 252B3 and 254B3) can be wiped based on determining that the most recent turn itself forms the most recent dialog session, and the initial two turns are part of a prior dialog session. Such a determination can be based on the time gap between the third turn and the second turn and/or based on the third turn relating to topic(s) (i.e., blackjack) that are disparate from topic(s) (e.g., weather) of the first two turns). In FIG. 2B, a visual cue 206 (a "checkmark") is provided on the display 205B of the assistant device 205 to visually indicate that the request of the spoken utterance 252B4 was performed. Further, an assistant response 254B4 is also audibly provided, and indicates that assistant interaction data for only the most recent turn will be deleted (i.e., by indicating it's topic) responsive to the request of the spoken utterance 252B4, removing any ambiguity of the action taken responsive to the vague spoken utterance 252B4. It is noted that, in the example of FIG. 2B, if the user 201 also intended assistant interaction data from prior turn(s) to be deleted, the user 201 could provide a further utterance to cause such deletion. For instance, the further utterance could be "forget everything I said for the last 5 minutes" or "forget the weather questions as well", either of which could be interpreted (e.g., using an NLU engine and/or interaction data engine) as requesting wiping of the earlier turns of FIG. 2B.

Figure 2C:
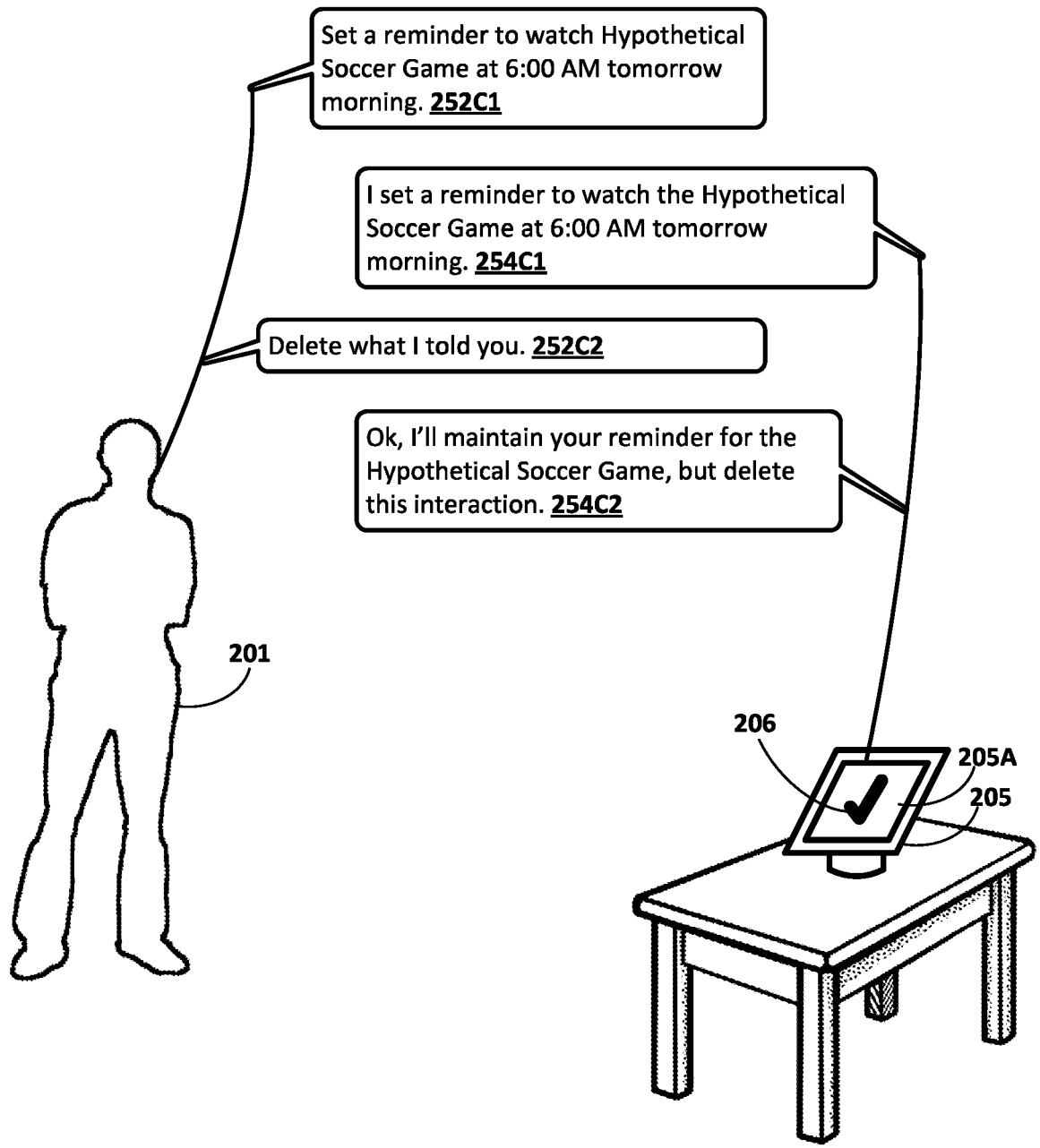

The example of FIG. 2C provides one example of spoken input 252C2 that causes retroactive wiping of assistant interaction data from previous assistant interaction(s) (i.e., the interaction of 252C1, 254C1), while maintaining a future action of a reminder notification that is queued for future performance, but not yet performed.

In FIG. 2B, the user provides a spoken utterances 252C1 that requests an action (provisioning of a reminder notification) to be performed in the future (tomorrow at 6:00 AM). A corresponding assistant response 254C1 is rendered audibly (and optionally visually) by the assistant device 205 and confirms that the action is queued for future performance. Spoken utterance 252C2 is provided shortly (e.g., 10 seconds after) assistant response 254C1, and indicates an intent to wipe assistant interaction data for one or more prior assistant interactions, but fails to indicate any temporal period (e.g., date range, hour range, minute range) for wiping the assistant interaction data. As a result, the automated assistant can, in some implementations, wipe assistant interaction data for only those interactions of a most recent dialog session, optionally if that most recent dialog session concluded within a threshold time of receiving the spoken utterance 252C2. In the example of FIG. 2C, assistant interaction data for only the most recent turn (i.e., 252C1 and 254C1) can be wiped based on determining that the most recent turn itself forms the most recent dialog session. However, notably, the action that is queued for future performance is not wiped but, rather, is maintained queued for future performance (i.e., a reminder notification will still be rendered tomorrow at 6:00 AM). In FIG. 2C, a visual cue 206 (a "checkmark") is provided on the display 205B of the assistant device 205 to visually indicate that the request of the spoken utterance 252C2 was performed. Further, an assistant response 254C2 is also audibly provided, and indicates that assistant interaction data for only the most recent interaction will be deleted responsive to the request of the spoken utterance 254C2, and indicates that the action will remain queued for future performance, removing any ambiguity as to what will be deleted and/or as to whether the action will remain queued for future performance.

Figure 2D:
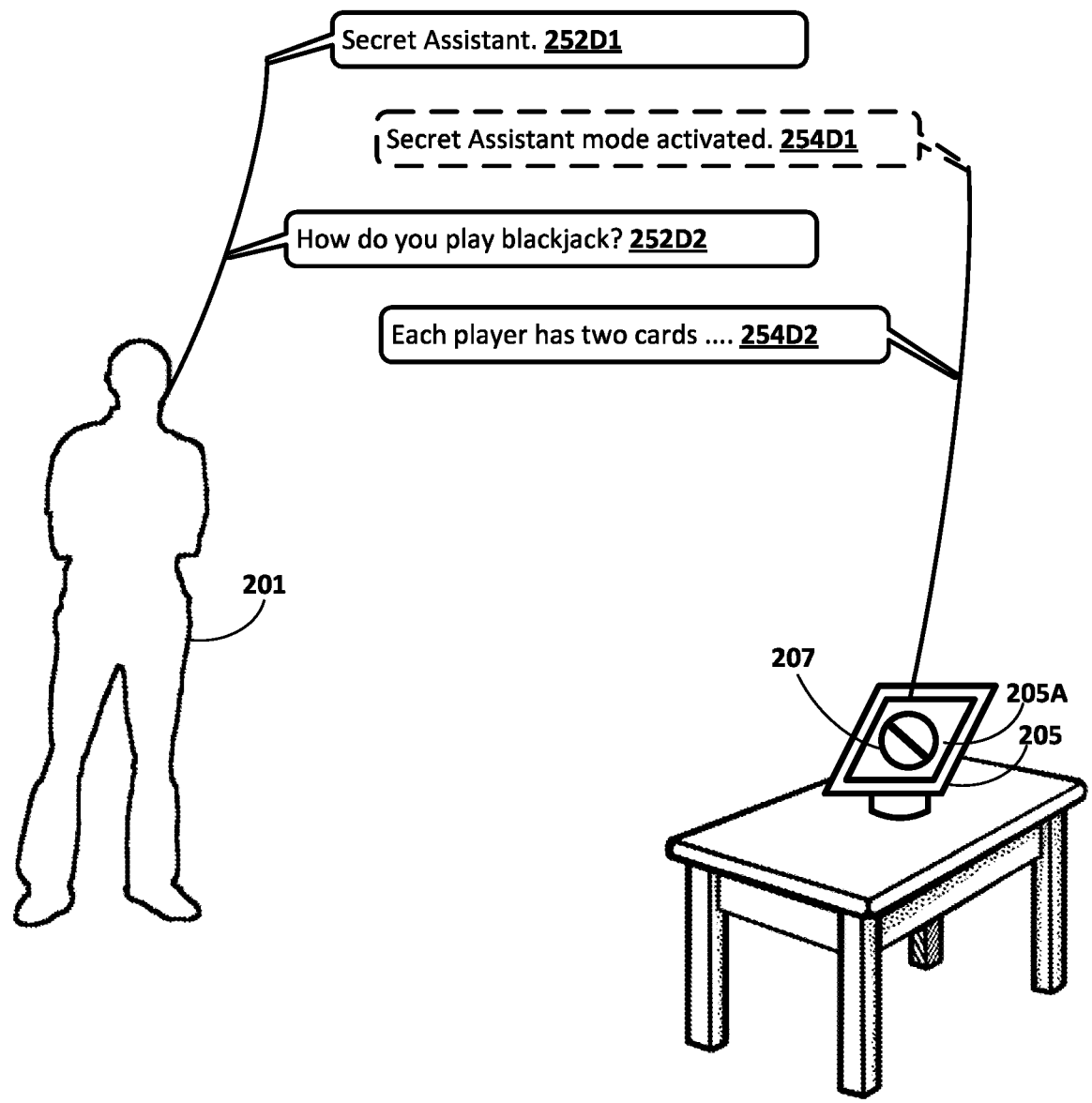

The example of FIG. 2D provides one example of spoken input 252D1 that invokes the automated assistant and that includes a particular invocation phrase ("secret assistant") that causes proactive prevention of non-transient storage of assistant interaction data. In FIG. 2D, symbol 207 is visually provided to provide an indication of such prevention, and will continue to be rendered until termination condition(s) occur. Put another way, the symbol 207 can be provided throughout the duration of the proactive prevention of non-transient storage of assistant interaction data. Optionally, assistant cue 254D1 can be audibly provided to also provide an indication of the initiation of such prevention. Additionally or alternatively, continuing audible cue(s) can be continuously provided during the duration of the prevention, such as a continual bird chirping noise, wave crashing noise, or other sound(s). Due to the proactive prevention triggered by spoken input 252D1, assistant interaction data related to spoken input 252D2 and/or assistant response 254D2 will never be non-transiently stored. It is noted that in some implementations, an audible and/or visual cue can additionally or alternatively be provided to provide an indication of when non-transient storage of assistant interaction data is occurring (i.e., when it is not being prevented).

Figure 3:
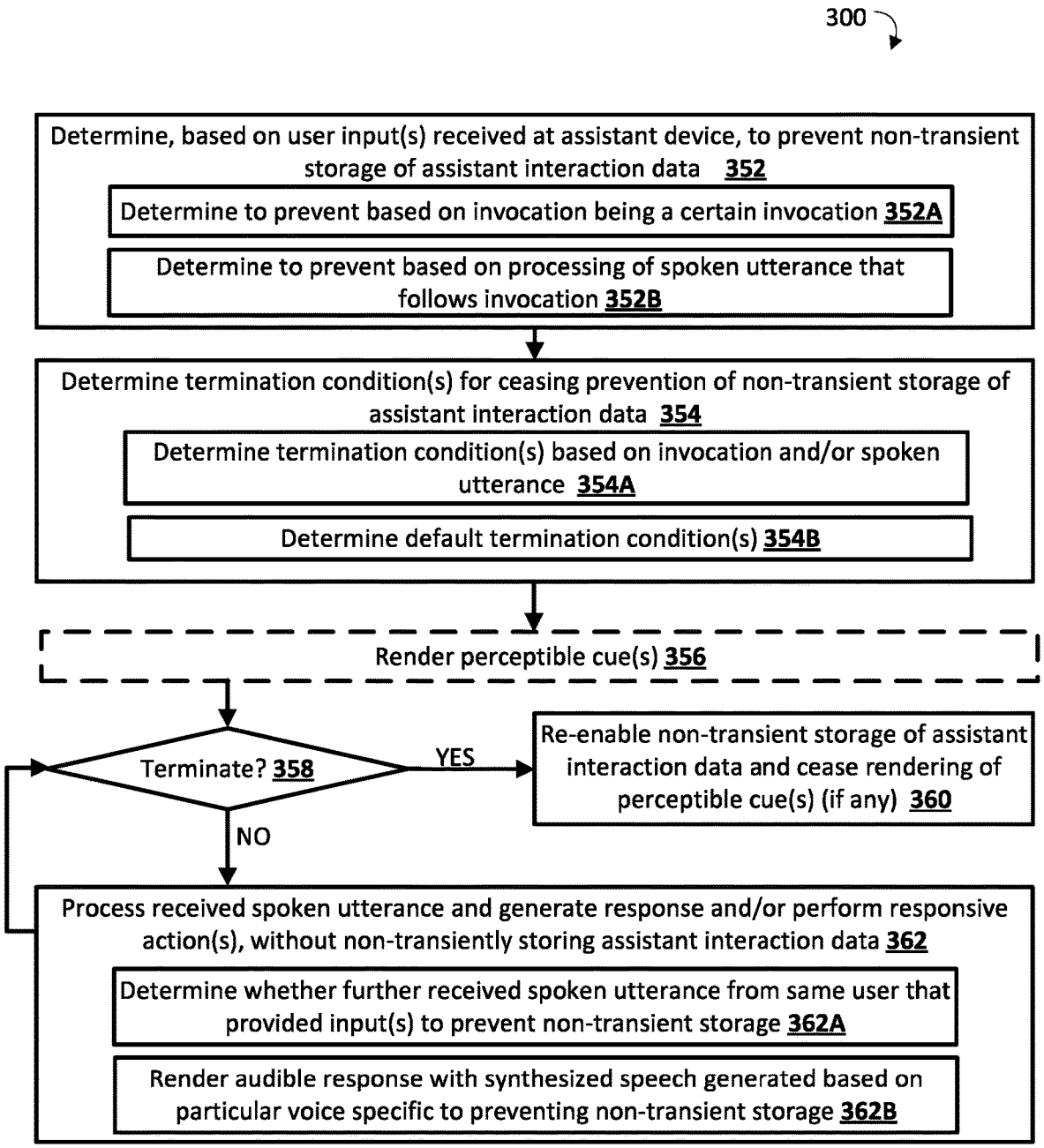
FIG. 3 is a flowchart illustrating an example method of proactively preventing storage of assistant interaction data, for turn(s) of a dialog, responsive to certain user input(s) received at an assistant device.

FIG. 3 is a flowchart illustrating an example method of proactively preventing storage of assistant interaction data, for turn(s) of a dialog, responsive to certain user input(s) received at an assistant device. For convenience, the operations of the flow chart are described with reference to a system that performs the operations. This system may include various components of various computer systems, such as one or more components of assistant device 110 or cloud-based automated assistant component(s) 140. Moreover, while operations of method 300 are shown in a particular order, this is not meant to be limiting. One or more operations may be reordered, omitted or added.

At block 352, the system determines, based on user input(s) received at an assistant device, to prevent non-transient storage of assistant interaction data. In some implementations, the system prevents non-transient storage of assistant interaction data only for interaction(s) at the assistant device. In some other implementations (and optionally dependent on the input(s)), the system prevents non-transient storage of assistant interaction data for interaction(s) at the assistant device, as well as for interaction(s) at one or more (e.g., all) assistant devices in an ecosystem of assistant devices of the user (e.g., those linked to an account of the user and optionally to a same structure as the assistant device). In some implementations, block 352 includes sub-block 352A or sub-block 352B.

At sub-block 352A, the system determines to prevent non-transient storage of assistant interaction data based on an invocation of the assistant being a certain invocation. For example, one or more particular invocations, when detected, can result in the system determining to prevent non-transient storage of assistant interaction data, and the system can prevent non-transient storage in response to determining the invocation is one of those particular invocations. For instance, the invocation can be a spoken invocation phrase.

The system can process audio data, using each of a plurality of disparate invocation phrase detection models each trained for a different subset (e.g., only a corresponding single one) of invocation phrase(s), to generate corresponding measures that each indicate whether the corresponding subset of invocation phrase(s) was present in the audio data. If the corresponding measure, generated utilizing a model trained for certain invocation phrase(s) for preventing non-transient storage (e.g., "Private Assistant"), indicates one of those invocation phrase(s) was detected, the system can determine to prevent non-transient storage of assistant interaction data. The certain invocation can additionally or alternatively include a touch-free gesture invocation, actuation of a certain hardware or software button, and/or actuation of a hardware or software button in a certain manner (e.g., long-press or double-tap).

At sub-block 352B, the system determines to prevent non-transient storage of assistant interaction data based on processing of a spoken utterance that follows an invocation. For example, the system can generate recognized text by performing ASR on audio data that captures the spoken utterance, then utilize NLU to determine that the recognized text expresses an intent to prevent non-transient storage of assistant interaction data.

At block 354, the system determines one or more termination conditions for ceasing the prevention of non-transient storage of assistant interaction data. Put another way, the system will continue to prevent non-transient storage of assistant interaction data until one or more of the condition(s) are satisfied. In some implementations, block 354 includes sub-block 354A and/or sub-block 354B.

At sub-block 354A, the system determines the termination condition(s) based on the invocation and/or the spoken utterance of block 352. For example, a spoken invocation phrase of "secret assistant" can be associated with a termination condition of "passage of 30 seconds" or "termination of current dialog session", whereas a spoken invocation phrase of "top secret assistant" can be associated with a termination condition of "passage of 1 hour". The system can select the corresponding termination condition as one of the termination conditions. As another example, a spoken utterance that follows invocation can specify a duration of the prevention, and that duration can be a parameter determined utilizing NLU, and the system can utilize expiration of that duration utilized as a termination condition. For instance, if the spoken utterance is "secret mode for 10 minutes", the duration expiration of 10 minutes can be utilized as a termination condition.

At sub-block 354B, the system additionally or alternatively determines one or more default conditions. The system can optionally always determine some default condition(s) that, if they occur, cease the prevention. For example, one such condition can be if there is another invocation detected that is not an invocation for preventing non-transient storage of assistant interaction data. In some implementations, the system can additionally or alternatively determine some default condition(s) when block 354A is not performed. For example, if no termination condition(s) are specified by the spoken utterance or the invocation, then default termination condition(s) can be determined, such as passage of a default duration of time or termination of a current dialog session.

At optional block 356, the system causes one or more audibly and/or visually perceptible cues to be rendered at the assistant device and, optionally, at one or more additional assistant devices of an ecosystem of assistant devices. For example, cue(s) can also be rendered at additional assistant device(s) in implementations where storage is also prevented for interaction(s) at those assistant device(s). In some implementations, the system causes the cue(s) to be continuously rendered throughout the duration of the prevention of storage (i.e., until a "yes" determination at block 358, described below).

At block 358, the system determines whether to terminate the prevention of the non-transient storage of assistant interaction data. The system can determine whether to terminate based on whether one or more of the condition(s) of block 354 have been satisfied. In some implementations and/or for some condition(s), occurrence of any single condition, of multiple conditions, can cause the system to determine to terminate. In some other implementations and/or for some other condition(s), multiple conditions must co-occur for the system to determine to terminate.

Block 358 can be performed iteratively (e.g., every second or at other frequency). So long as the decision at block 358 is to not terminate the prevention, the system will prevent non-transient storage of assistant interaction data for interaction(s) at the assistant device and optionally additional assistant device(s). For example, at block 362, the system can process a received spoken utterance and generate a response (audible and/or visual) and/or perform responsive action(s) (e.g., control smart device(s)), and do so without non-transiently storing assistant interaction data. One or more iterations of block 362 can occur. For example, an iteration of block 362 can be a turn of a dialog and, depending on the termination condition(s), multiple turns of a dialog can occur through multiple iterations of block 362.

In some implementations, block 362 includes sub-block 362A and/or sub-block 362B.

At sub-block 362A, the system determines whether the further received spoken utterance is from the same user that provided the input(s) at block 352, and only prevents non-transient storage of corresponding assistant interaction data if it is determined it is from the same user. Accordingly, with sub-block 362A, the prevention of storage is personal to the user that provided the input(s) at block 352, while storage is not prevented for other user(s). In determining whether the further received spoken utterance is from the same user, voice identification and/or facial identification can be performed based on the further spoken utterance and could also have been performed when the input(s) were received at block 352. The further received spoken utterance can be determined to be from the same user only if the two identifications indicate the same user provided the input(s) at block 352 and the further spoken utterance at block 362.

At sub-block 362B, the system renders all or part of an audible response with synthesized speech that is generated based on a particular voice that is specific to preventing non-transient storage. For example, the synthesized voice can have one or more voice characteristics that differentiate it from other synthesized voice(s), and the synthesized voice can, at least for the user and optionally for a population of (e.g., all) users, only be utilized when non-transient storage of assistant interaction data is being prevented. For example, one or more prosodic properties of the synthesized voice can be distinct from all other synthesized voices utilized by the automated assistant for the user and/or for a population of (e.g., all) users. Accordingly, hearing such a synthesized voice can serve as a cue (in addition to or instead of the cue(s) of block 356) for the user to inform the user that the prevention of storage is persisting. This can prevent the user from unnecessarily again requesting prevention of non-transient storage and/or requesting retroactive wiping of the instance interaction (e.g., using method 400 of FIG. 4, described below). This can prevent waste of computational resources and/or prevent extending the duration of the assistant/user interaction.

If the decision at block 358 is yes at an iteration, then the system proceeds to block 360. At block 360, the system re-enables non-transient storage of assistant interaction data and ceases rendering of perceptible cue(s) (if any) of block 356. The non-transient storage of assistant interaction data can persist until certain input(s) are again received in another iteration of block 352.

Method 300 is illustrated and described as proactively preventing storage of assistant interaction data, for turn(s) of a dialog, responsive to certain user input(s) received at an assistant device. However, it is noted that method 300 can be adapted to instead enable storage of assistant interaction data, for turn(s) of a dialog, responsive to certain user input(s) received at an assistant device. For example, the default can be to prevent non-transient storage of assistant interaction data, the input(s) of block 352 can be specific to enabling non-transient storage of assistant interaction data, and the termination condition(s) determined at block 354 can dictate when the enabling storage of assistant interaction data will cease.

Additionally, instead of or in addition to preventing non-transient storage of assistant interaction data, in some implementations the input(s) of block 352 can prevent at least some (e.g. prevent any) personal data from being utilized in generating at least some (e.g., all) response(s) and/or performing at least some (e.g., all) responsive action(s) at block 362. For example, in addition to preventing non-transient storage of assistant interaction data at block 362, block 362 can also include preventing utilization of personal data (i.e., data stored in association with a user account and personal to the user account) in generating at least some (or even all) responses. For instance, if a received spoken utterance at block 362 was "what's on my calendar", an "error" response may be provided since calendar data of the user is personal data and cannot be utilized in generating the response. As another instance, if a received spoken utterance at block 362 was "play some music", a song could be played but the song would be selected independent of any personal data of the user (i.e., it would not be selected based on musical preference(s) of the user).

Figure 4:
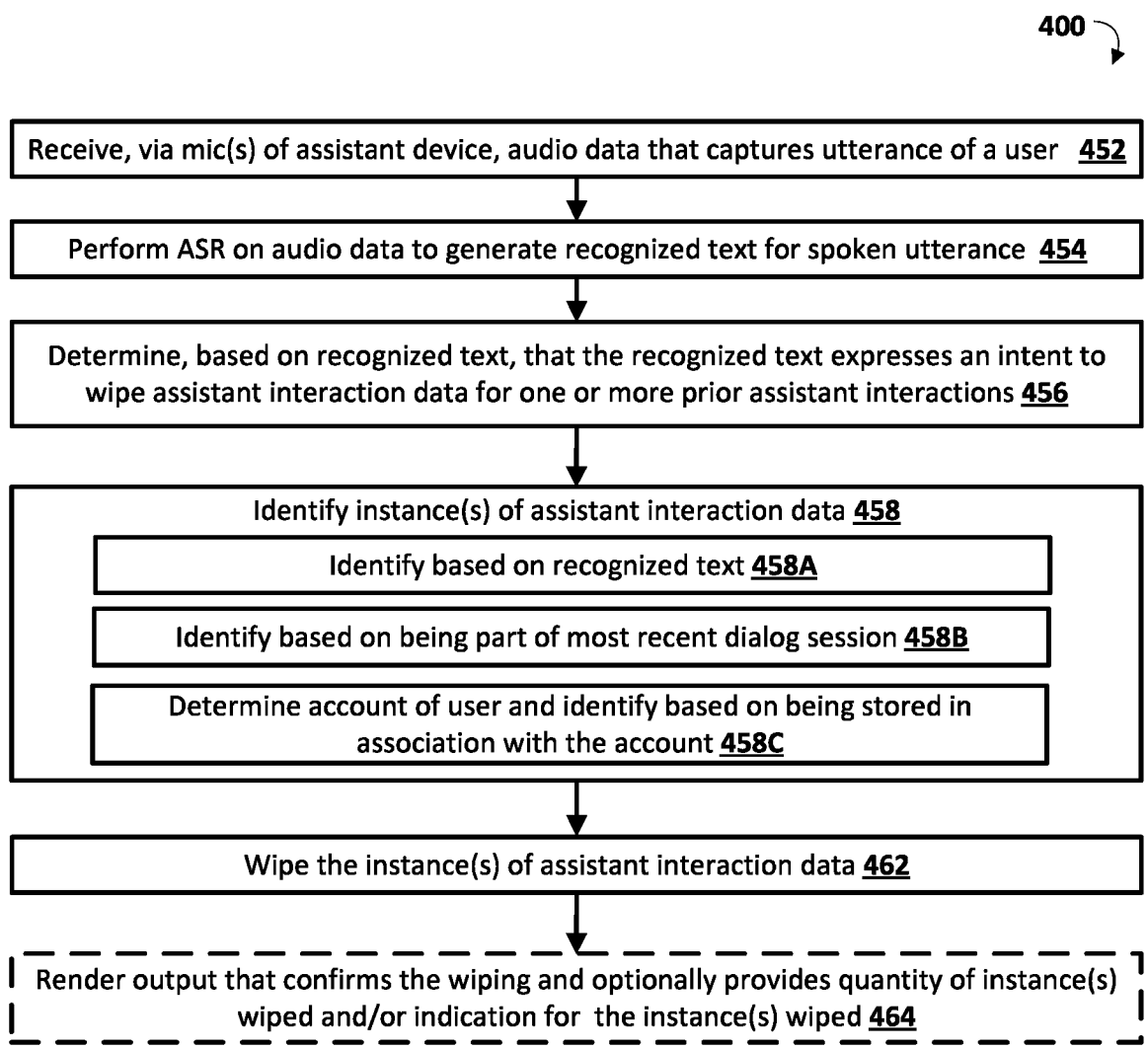
FIG. 4 is a flowchart illustrating an example method of retroactively wiping stored instance(s) of assistant interaction data responsive to certain user input(s) received at an assistant device.

FIG. 4 is a flowchart illustrating an example method retroactively wiping stored instance(s) of assistant interaction data responsive to certain user input(s) received at an assistant device. For convenience, the operations of the flow chart are described with reference to a system that performs the operations. This system may include various components of various computer systems, such as one or more components of assistant device 110 or cloud-based automated assistant component(s) 140. Moreover, while operations of method 400 are shown in a particular order, this is not meant to be limiting. One or more operations may be reordered, omitted or added.

At block 452, the system receives, via microphone(s) of an assistant device, audio data that captures an utterance of a user.

At block 454, the system performs ASR on the audio data to generate recognized text for the spoken utterance.

At block 456, the system determines, based on the recognized text of the spoken utterance, that the recognized text expresses an intent to wipe assistant interaction data for one or more prior assistant interactions. For example, the system can perform NLU to determine the intent.

At block 458, the system identifies instance(s) of assistant interaction data to be wiped. Block 458 can include one or more of sub-blocks 458A, 458B, and 458C.

At sub-block 458A, the system identifies the instance(s) of assistant interaction data based on the recognized text of the utterance. For example, the utterance can include a temporal period (e.g., "delete everything from the last week") and the temporal period can be used to identify instance(s) of assistant interaction data that fall within that temporal period. For example, timestamp(s) of the assistant interaction data can be utilized. Processing of the recognized text utilizing NLU can be performed to identify the temporal period (e.g., the temporal period can be a parameter outputted by the NLU processing).

At sub-block 458B, the system identifies the instance(s) based on the instance(s) being part of a most recent dialog session. Sub-block 458B can optionally be performed, in lieu of sub-block 458A, when the system determines the recognized text fails to specify a temporal period.

At sub-block 458C, the system determines an account of the user and identifies the instance(s) based on the instance(s) being stored in association with the account. Put another way, the system can identify those instance(s) that are for interactions of the user that provided the spoken utterance (interaction(s) from the assistant device and/or other assistant device(s)) instead of simply all instances from the assistant device (that can include those from other user(s)). The system can determine the account of the user using speaker identification, facial recognition, and/or other verification technique(s).

At block 462, the system wipes the instance(s) of assistant interaction data.

At optional block 464, the system renders output that confirms the wiping and that optionally provides quantity of instance(s) wiped and/or an indication for the instance(s) wiped. For example, the output can identify the quantity of dialog turn(s) and/or dialog sessions(s) that were wiped. As another example, the output can identify topic(s) and/or other summarization(s) of the dialog turn(s) and/or dialog sessions(s) that were wiped.

In various implementations, the instance(s) of assistant interaction data described herein can include, for example, audio data that captures spoken input, the generated text transcription thereof (e.g., generated using a speech-to-text model), natural language understanding (NLU) data based on the text transcription (e.g., an intent (e.g., "today's weather") and/or parameter(s) (e.g., the city of Louisville), and/or data that characterizes the assistant response (e.g., the response itself and/or topic(s) of the response). The instance(s) of assistant interaction data can additionally or alternatively include image(s), video, and/or other vision data captured during a dialog session and/or data that is based on processing such image data. For example, during a dialog session via an assistant device with a camera, a user may hold an item in front of the camera and provide a spoken utterance of "what is this". An automated assistant can process the vision data, using a neural network model, to generate predicted classification(s) for the object, and generate a response to the spoken utterance based on the predicted classification(s). The assistant interaction data in such an example can include the vision data and/or the predicted classification(s). The instance(s) of assistant interaction data can additionally or alternatively include audio data that does not capture a spoken utterance of a user, and or other data based on processing such audio data. For example, during a dialog session via an assistant device, a user can provide a spoken utterance of "what is this song", and audio data can be processed to identify the song. The assistant interaction data in such an example can include the audio data and/or the identified song.

Implementations have been described herein with respect to a general automated assistant via which a user can engage in a variety of dialogs to achieve various tasks. For example, a user can utilize the automated assistant to control smart device(s), to play music, to place telephone calls, to create calendar entries, to create reminders, to inquire about the weather, and/or to perform additional and/or alternative tasks across other verticals. In some implementations, various techniques described herein can additionally or alternatively be utilized in combination with one or more non-automated assistant systems and/or with an automated assistant that is devoted to engaging with user(s) for only a single task or for only a single vertical. For example, a device and/or an application can be devoted to receiving impaired speech, processing the impaired speech to generate synthesized non-impaired speech, and rendering the synthesized non-impaired speech. With such an example, non-transient storage of interaction data (e.g., the impaired speech and/or the non-impaired speech from a dialog turn) can be selectively enabled and/or disabled dependent on how the device and/or the application is invoked. Additionally or alternatively, with such an example, any stored interaction data can additionally or alternatively be retroactively wiped responsive to certain user input(s) received at the device or application.

Figure 5:
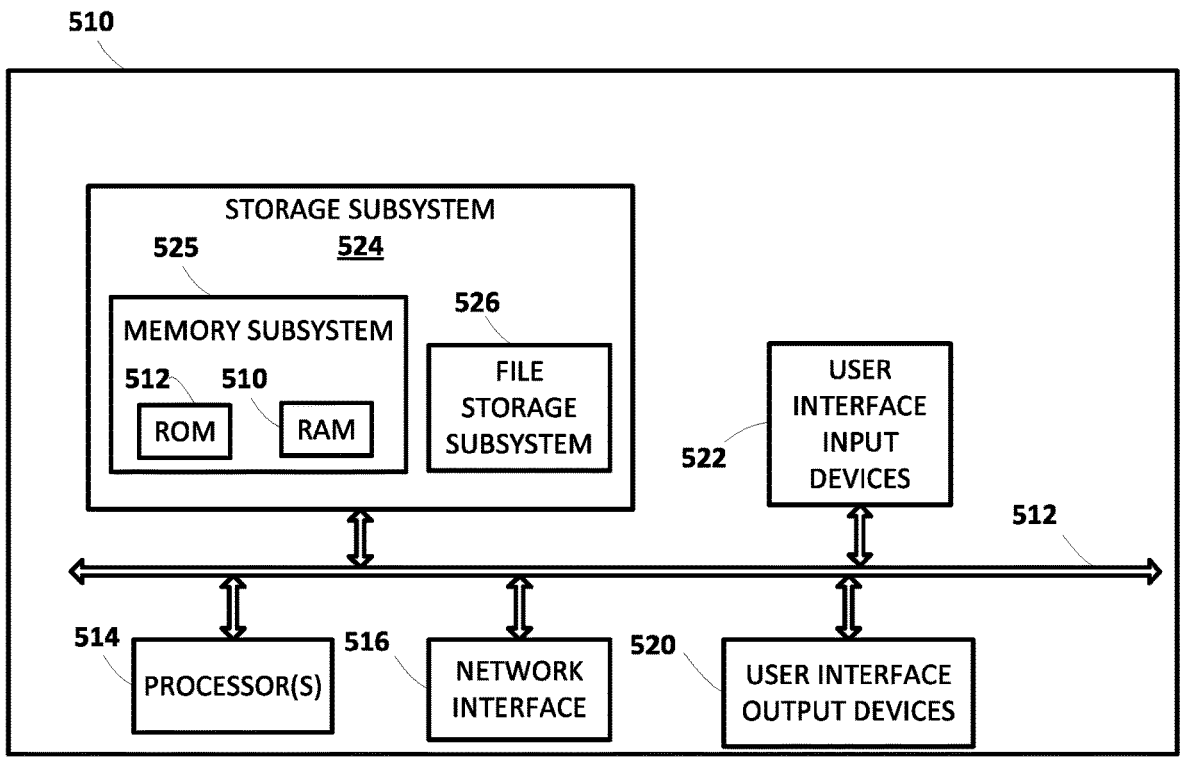
FIG. 5 illustrates an example architecture of a computing device.

Referring now to FIG. 5, a block diagram of an example computing device 510 is illustrated that may optionally be utilized to perform one or more aspects of techniques described herein. In some implementations, one or more of an assistant device, cloud-based automated assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components.

These software modules are generally executed by processor 514 alone or in combination with other processors. Memory 525 used in the storage subsystem 524 can include a number of memories including a main random access memory (RAM) 510 for storage of instructions and data during program execution and a read only memory (ROM) 512 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information (e.g., messages exchanged in message exchange threads), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used. For example, in some implementations, message exchange thread participants operating message exchange clients configured with selected aspects of the present disclosure may opt out of having message exchange thread content monitored, e.g., so that a participant desiring transition of a message exchange client into or out of a private state would do so manually.

In some implementations, a method is provided that includes processing audio data, using a speech recognition model, to generate recognized text of a spoken utterance, of a user, that is captured in the audio data. The audio data is detected via one or more microphones of an assistant device. The method further includes determining that the recognized text expresses an intent to wipe assistant interaction data for one or more prior assistant interactions of the user. The method further includes determining an account associated with the user that provided the spoken utterance. The method further includes, in response to determining that the recognized text expresses the intent to wipe the assistant interaction data: identifying, in one or more computer readable media, one or more instances of assistant interaction data, for the user, based on the one or more instances being stored in association with the determined account; and wiping the identified one or more instances of assistant interaction data from the one or more computer readable media.

These and other implementations of the technology disclosed herein can include one or more of the following features.

In some implementations, the method further includes determining that the recognized text fails to indicate any temporal period for wiping the assistant interaction data. In those implementations, identifying the one or more instances of assistant interaction data further includes, in response to determining that the recognized text fails to indicate any temporal period for wiping the assistant interaction data: identifying the one or more instances of assistant interaction data further based on determining that the one or more instances are each part of a most recent dialog session between the user and the automated assistant. In some versions of those implementations, the one or more instances of assistant interaction data include a first instance and a second instance, and the method further includes determining that the one or more instances are each part of the most recent dialog session between the user and the automated assistant. Determining that the one or more instances are each part of the most recent dialog session between the user and the automated assistant can include: determining that a first timestamp, that is stored in association with the first instance, is within a threshold duration of a second timestamp that is stored in association with the second instance; and comparing a current time to the first timestamp and/or to the second timestamp. In some of those versions, determining the one or more instances are each part of the most recent dialog session between the user and the automated assistant is further based on determining that a first topic stored in association with the first instance is within a threshold semantic distance of a second topic stored in association with the second instance. For example, a first embedding can be generated (e.g., using Word2Vec or other semantic embedding model) for a first descriptor of the first topic, a second embedding can be generated for a second descriptor of the second topic, and the semantic distance can be the distance, in embedding space, between the first embedding and the second embedding. As another example, the semantic distance can be based on how many edges are in a shortest path between the first topic and the second topic in a knowledge graph or other taxonomic structure. Optionally, the first instance includes: first audio data that captures a first utterance of the user, a first transcription of the first utterance of the user, first natural language understanding data generated based on the first transcription, and/or first response data that characterizes an assistant response to the first utterance. Optionally, the second instance includes: second audio data that captures a second utterance of the user, a second transcription of the second utterance of the user, second natural language understanding data generated based on the second transcription, and/or second response data that characterizes an assistant response to the second utterance.

In some implementations, determining the account associated with the user that provided the spoken utterance includes: performing speaker identification using the audio data and/or invocation audio data that immediately preceded the audio data; and determining the account associated with the user based on performing the speaker identification. In some versions of those implementations, performing the speaker identification includes generating, at the assistant device, an embedding based on processing the audio data and/or the invocation audio data. In some of those versions, determining the account associated with the user based on performing the speaker identification includes matching the embedding to a pre-stored embedding that is stored locally at the assistant device, and determining that the matching pre-stored embedding is stored in association with the account.

In some implementations, the method further includes, subsequent to identifying the one or more instances of assistant interaction data: causing audible output and/or visual output to be rendered, at the assistant device, that confirms the wiping of the identified one or more instances of assistant interaction data from the one or more computer readable media. In some versions of those implementations, the method further includes generating the audible output and/or the visual output to include: a quantity of the one or more instances of assistant interaction data; and/or a corresponding indication for each of the instances of assistant interaction data. In some of those versions, the corresponding indication for each of the instances of assistant interaction data includes a corresponding topic for each of the instances of assistant interaction data.

In some implementations, each of the instances of assistant interaction data includes data from a corresponding single turn of user-assistant dialog.

In some implementations, the method further includes determining that the recognized text indicates a temporal period for wiping the assistant interaction data. In some of those implementations, identifying the one or more instances of assistant interaction data further includes, in response to determining that the recognized text indicates the temporal period for wiping the assistant interaction data: identifying the one or more instances of assistant interaction data further based on determining that corresponding timestamps, stored in association with the one or more instances, all fall within the temporal period for wiping the assistant interaction data. In some versions of those implementations, determining the account associated with the user that provided the spoken utterance includes: performing speaker identification using the audio data and/or invocation audio data that immediately preceded the audio data; and determining the account associated with the user based on performing the speaker identification.

In some implementations, a given instance, of the one or more instances of assistant interaction data, corresponds to a dialog turn that caused queuing performance of a future action at a future time that precedes a current time. In some of those implementations, wiping the identified one or more instances of assistant interaction data from the one or more computer readable media occurs without affecting performance of the future action at the future time. In some versions of those implementations the future action includes controlling a smart device and/or causing a notification to be rendered.

In some implementations, the user input is a particular touch-free gesture detected in one or more vision frames generated by a camera of the assistant device, and detection of an alternate touch-free gesture causes non-transient storage of assistant interaction data for at least an assistant interaction that immediately follows the alternate touch-free gesture.

In some implementations, causing the assistant response to be rendered at the assistant device includes causing an audible portion of the assistant response to be rendered in a particular synthesized voice. Causing the audible portion to be rendered in the particular synthesized voice is responsive to determining to prevent the non-transient storage of assistant interaction data. The particular synthesized voice is utilized, at least for the user, only when non-transient storage of assistant interaction data is being prevented.

In some implementations, the method further includes determining, based on the user input, to additionally prevent utilization of any personal data in generating assistant responses until the one or more termination conditions are satisfied. In some of those implementations, determining the assistant response that is responsive to the spoken utterance comprises, in response to determining to additionally prevent utilization of any personal data in generating assistant responses, determining the assistant response independent of any personal data.

In some implementations, a method is provided that includes determining, based on user input received at an assistant device, to prevent non-transient storage of assistant interaction data until one or more termination conditions are satisfied. The method further includes, responsive to determining to prevent the non-transient storage of assistant interaction data, and until the one or more termination conditions are satisfied: causing the assistant device to render a visually perceptible and/or audibly perceptible cue. The method further includes, while preventing the non-transient storage of assistant interaction data and prior to the one or more termination conditions being satisfied: processing audio data, using a speech recognition model, to generate recognized text of a spoken utterance, of a user, that is captured in the audio data, wherein the audio data is detected via one or more microphones of the assistant device; determining, based on the recognized text, an assistant response that is responsive to the spoken utterance; causing the assistant response to be rendered at the assistant device; and responsive to determining to prevent the non-transient storage of assistant interaction data, preventing non-transient storage of the audio data, the recognized text, and/or the assistant response. The method further includes, responsive to determining the one or more termination conditions are satisfied, enabling non-transient storage of assistant interaction data.

These and other implementations of the technology disclosed herein can include one or more of the following features.

In some implementations, the assistant device is one of a plurality of assistant devices in an ecosystem of assistant devices associated with the user. In some of those implementations, the method further includes, responsive to determining to prevent the non-transient storage of assistant interaction data, preventing non-transient storage of any of the assistant interaction data from interactions with any of the assistant devices in the ecosystem. In some versions of those implementations, the method further includes, responsive to determining to prevent the non-transient storage of assistant interaction data, and until the one or more termination conditions are satisfied: causing the plurality of assistant devices, that are in addition to the assistant device, to each render a corresponding visually perceptible and/or audibly perceptible cue. In some of those versions, causing the plurality of assistant devices, that are in addition to the assistant device, to each render the corresponding visually perceptible and/or audibly perceptible cue includes transmitting, by the assistant device and to the plurality of assistant devices that are in addition to the assistant device, a command that causes the rendering of the corresponding visually perceptible and/or audibly perceptible cues. In some other of those versions, causing the plurality of assistant devices, that are in addition to the assistant device, to each render the corresponding visually perceptible and/or audibly perceptible cue includes transmitting, by remote assistant server in communication with the assistant device and to the plurality of assistant devices that are in addition to the assistant device, a command that causes the rendering of the corresponding visually perceptible and/or audibly perceptible cues.

In some implementations, preventing the non-transient storage of assistant interaction data is for only an account associated with the user that provided the user input. In some of those implementations, the method further includes: determining the account associated with the user that provided the user input to prevent the non-transient storage; and preventing non-transient storage of the audio data, the recognized text, and/or the assistant response is further in response to determining that the spoken input matches a stored speaker embedding for the account.

In some implementations, the one or more termination conditions include passage of a threshold amount of time and/or completion of a dialog session that immediately follows the user input.

In some implementations, the user input is actuation of a hardware of software button in a given manner and, optionally, actuation of the hardware or software button in an alternate manner causes non-transient storage of assistant interaction data for at least an assistant interaction that immediately follows actuation in the alternate manner.

In some implementations, the user input is a spoken particular assistant invocation phrase and, optionally, an alternate spoken assistant invocation phrase manner causes non-transient storage of assistant interaction data for at least an assistant interaction that immediately follows the alternate spoken assistant invocation phrase.

In some implementations a method implemented by one or more processors is provided and includes determining, based on user input received at an assistant device, to prevent utilization of any personal data in generating assistant responses until one or more termination conditions are satisfied. The method further includes, prior to the one or more termination conditions being satisfied: processing audio data, using a speech recognition model, to generate recognized text of a spoken utterance, of a user, that is captured in the audio data; determining, based on the recognized text, an assistant response that is responsive to the spoken utterance; and causing the assistant response to be rendered at the assistant device. Determining the assistant response that is responsive to the spoken utterance includes, in response to determining to additionally prevent utilization of any personal data in generating assistant responses, determining the assistant response independent of any personal data. The method further includes, responsive to determining the one or more termination conditions are satisfied: enabling determining of assistant responses utilizing personal data.

These and other implementations of the technology disclosed herein can include one or more of the following features.

In some implementations, causing the assistant response to be rendered at the assistant device includes causing an audible portion of the assistant response to be rendered in a particular synthesized voice. Causing the audible portion to be rendered in the particular synthesized voice is responsive to determining to prevent the non-transient storage of assistant interaction data. Optionally, the particular synthesized voice is utilized, at least for the user, only when non-transient storage of assistant interaction data is being prevented.

In some implementations, a method implemented by one or more processors is provided and includes determining, based on user input received at an assistant device, to prevent non-transient storage of assistant interaction data until one or more termination conditions are satisfied. The method further includes, while preventing the non-transient storage of assistant interaction data and prior to the one or more termination conditions being satisfied: processing audio data detected via microphone(s) of the assistant device, using a speech recognition model, to generate recognized text of a spoken utterance, of a user, that is captured in the audio data; determining, based on the recognized text, an assistant response that is responsive to the spoken utterance; causing the assistant response to be rendered at the assistant device; and responsive to determining to prevent the non-transient storage of assistant interaction data, preventing non-transient storage of the audio data, the recognized text, and/or the assistant response. The method further includes, responsive to determining the one or more termination conditions are satisfied: enabling non-transient storage of assistant interaction data.

In addition, some implementations include one or more processors of one or more computing devices, where the one or more processors are operable to execute instructions stored in associated memory, and where the instructions are configured to cause performance of any of the methods disclosed herein. Some implementations include at least one non-transitory computer readable storage medium storing computer instructions executable by one or more processors to perform any of the methods disclosed herein.

What is claimed is:

1. A method implemented by one or more processors, the method comprising:
    determining, based on user input received at an assistant device, to prevent non-transient storage of assistant interaction data until one or more termination conditions are satisfied, wherein the user input is a spoken particular assistant invocation phrase representing an initiation of user input to the assistant device, and wherein an alternate spoken assistant invocation phrase causes non-transient storage of assistant interaction data for at least an assistant interaction that immediately follows the alternate spoken assistant invocation phrase;
    responsive to determining to prevent the non-transient storage of assistant interaction data, and until the one or more termination conditions are satisfied:
        causing the assistant device to render a visually perceptible and/or audibly perceptible cue;
    while preventing the non-transient storage of assistant interaction data and prior to the one or more termination conditions being satisfied:
        processing audio data, using a speech recognition model, to generate recognized text of a spoken utterance, of a user, that is captured in the audio data, wherein the audio data is detected via one or more microphones of the assistant device;
        determining, based on the recognized text, an assistant response that is responsive to the spoken utterance;
        causing the assistant response to be rendered at the assistant device; and
        responsive to determining to prevent the non-transient storage of assistant interaction data, preventing non-transient storage of the audio data, the recognized text, and/or the assistant response; and
    responsive to determining the one or more termination conditions are satisfied:
        enabling non-transient storage of assistant interaction data.

2. The method of claim 1, wherein the assistant device is one of a plurality of assistant devices in an ecosystem of assistant devices associated with the user, and wherein responsive to determining to prevent the non-transient storage of assistant interaction data, preventing non-transient storage of any of the assistant interaction data from interactions with any of the assistant devices in the ecosystem.

3. The method of claim 2, further comprising:
    responsive to determining to prevent the non-transient storage of assistant interaction data, and until the one or more termination conditions are satisfied:
        causing the plurality of assistant devices, that are in addition to the assistant device, to each render a corresponding visually perceptible and/or audibly perceptible cue.

4. The method of claim 3, wherein causing the plurality of assistant devices, that are in addition to the assistant device, to each render the corresponding visually perceptible and/or audibly perceptible cue comprises transmitting, by the assistant device and to the plurality of assistant devices that are in addition to the assistant device, a command that causes the rendering of the corresponding visually perceptible and/or audibly perceptible cues.

5. The method of claim 3, wherein causing the plurality of assistant devices, that are in addition to the assistant device, to each render the corresponding visually perceptible and/or audibly perceptible cue comprises transmitting, by remote assistant server in communication with the assistant device and to the plurality of assistant devices that are in addition to the assistant device, a command that causes the rendering of the corresponding visually perceptible and/or audibly perceptible cues.

6. The method of claim 1, wherein preventing the non-transient storage of assistant interaction data is for only an account associated with the user that provided the user input, and further comprising:
    determining the account associated with the user that provided the user input to prevent the non-transient storage;
    wherein preventing non-transient storage of the audio data, the recognized text, and/or the assistant response is further in response to determining that the spoken input matches a stored speaker embedding for the account.

7. The method of claim 1, wherein the one or more termination conditions comprise passage of a threshold amount of time.

8. The method of claim 1, wherein the one or more termination conditions comprise completion of a dialog session that immediately follows the user input.

9. The method of claim 1, wherein the user input is actuation of a hardware of software button in a given manner, and wherein actuation of the hardware or software button in an alternate manner causes non-transient storage of assistant interaction data for at least an assistant interaction that immediately follows actuation in the alternate manner.

10. The method of claim 1, wherein the user input is a particular touch-free gesture detected in one or more vision frames generated by a camera of the assistant device, and wherein detection of an alternate touch-free gesture causes non-transient storage of assistant interaction data for at least an assistant interaction that immediately follows the alternate touch-free gesture.

11. The method of claim 1, wherein causing the assistant response to be rendered at the assistant device comprises:
causing an audible portion of the assistant response to be rendered in a particular synthesized voice, wherein causing the audible portion to be rendered in the particular synthesized voice is responsive to determining to prevent the non-transient storage of assistant interaction data, and wherein the particular synthesized voice is utilized, at least for the user, only when non-transient storage of assistant interaction data is being prevented.

12. The method of claim 1, further comprising:
determining, based on the user input, to additionally prevent utilization of any personal data in generating assistant responses until the one or more termination conditions are satisfied;
wherein determining the assistant response that is responsive to the spoken utterance comprises, in response to determining to additionally prevent utilization of any personal data in generating assistant responses, determining the assistant response independent of any personal data.

13. A method implemented by one or more processors, the method comprising:
processing audio data, using a speech recognition model, to generate recognized text of a spoken utterance, of a user, that is captured in the audio data, wherein the audio data is detected via one or more microphones of an assistant device;
determining that the recognized text expresses an intent to wipe assistant interaction data for one or more prior assistant interactions of the user and that the recognized text fails to indicate any temporal period for wiping the assistant interaction data;
determining an account associated with the user that provided the spoken utterance;
in response to determining that the recognized text expresses the intent to wipe the assistant interaction data:
identifying, in one or more computer readable media, one or more instances of assistant interaction data, for the user, based on the one or more instances being stored in association with the determined account, wherein the one or more instances of assistant interaction data comprise a first instance and a second instance, and wherein identifying the one or more instances of assistant interaction data comprises, in response to determining that the recognized text fails to indicate any temporal period for wiping the assistant interaction data:
determining that the one or more instances are each part of a most recent dialog session between the user and the automated assistant, wherein determining that the one or more instances are each part of the most recent dialog session between the user and the automated assistant comprises:
determining that a first timestamp stored in association with the first instance is within a threshold duration of a second timestamp stored in association with the second instance, and
comparing a current time to the first timestamp and/or to the second timestamp; and
wiping the identified one or more instances of assistant interaction data from the one or more computer readable media.

14. The method of claim 13, wherein determining the one or more instances are each part of the most recent dialog session between the user and the automated assistant is further based on:
determining that a first topic stored in association with the first instance is within a threshold semantic distance of a second topic stored in association with the second instance.

15. The method of claim 13,
wherein the first instance comprises: first audio data that captures a first utterance of the user, a first transcription of the first utterance of the user, first natural language understanding data generated based on the first transcription, and/or first response data that characterizes an assistant response to the first utterance; and
wherein the second instance comprises: second audio data that captures a second utterance of the user, a second transcription of the second utterance of the user, second natural language understanding data generated based on the second transcription, and/or second response data that characterizes an assistant response to the second utterance.

16. The method of claim 13, wherein determining the account associated with the user that provided the spoken utterance comprises:
performing speaker identification using the audio data and/or invocation audio data that immediately preceded the audio data; and
determining the account associated with the user based on performing the speaker identification.

17. A device comprising:
one or more processors; and
memory operably coupled with the one or more processors, wherein the memory stores instructions that, in response to execution of the instructions by one or more processors, cause the one or more processors to perform a method comprising:
determining, based on user input received at an assistant device, to prevent non-transient storage of assistant interaction data until one or more termination conditions are satisfied, wherein the user input is a spoken particular assistant invocation phrase representing an initiation of user input to the assistant device, and wherein an alternate spoken assistant invocation phrase causes non-transient storage of assistant interaction data for at least an assistant interaction that immediately follows the alternate spoken assistant invocation phrase;
responsive to determining to prevent the non-transient storage of assistant interaction data, and until the one or more termination conditions are satisfied:
causing the assistant device to render a visually perceptible and/or audibly perceptible cue;
while preventing the non-transient storage of assistant interaction data and prior to the one or more termination conditions being satisfied:
processing audio data, using a speech recognition model, to generate recognized text of a spoken utterance, of a user, that is captured sin the audio data, wherein the audio data is detected via one or more microphones of the assistant device;

determining, based on the recognized text, an assistant response that is responsive to the spoken utterance;

causing the assistant response to be rendered at the assistant device; and responsive to determining to prevent the non-transient storage of assistant interaction data, preventing non-transient storage of the audio data, the recognized text, and/or the assistant response; and responsive to determining the one or more termination conditions are satisfied:

enabling non-transient storage of assistant interaction data.

* * * * *